United States Patent
Cooper

[19]

[11] Patent Number: 6,138,661

[45] Date of Patent: Oct. 31, 2000

[54] WOOD COAL COOK STOVE

[76] Inventor: Ronald D. Cooper, P.O. Box 1866, Collegedale, Tenn. 37315-1866

[21] Appl. No.: 09/427,662

[22] Filed: Oct. 27, 1999

[51] Int. Cl.[7] .................. A47J 37/00; F24B 3/00
[52] U.S. Cl. .................. 126/25 R; 126/275 R; 126/30; 126/19 M; 126/245
[58] Field of Search .............. 126/25 R, 275 R, 126/274, 273 R, 29, 30, 9 R, 19 M, 554, 555, 540, 541, 542, 543, 245, 242, 243

[56] References Cited

U.S. PATENT DOCUMENTS

| | | | |
|---|---|---|---|
| D. 172,672 | 7/1954 | Lennox | D7/337 |
| 1,011,675 | 12/1911 | Tremoulet | 126/25 R |
| 1,042,273 | 10/1912 | Roe | 126/25 R |
| 2,513,580 | 7/1950 | Milligan | 126/25 R |
| 3,209,742 | 10/1965 | Crowley et al. | 126/25 R |
| 3,327,699 | 6/1967 | Uden | 126/25 R |
| 3,378,002 | 4/1968 | Hink | 126/25 R |
| 4,452,224 | 6/1984 | Misumida | 126/25 R |
| 5,024,208 | 6/1991 | Hottenroth et al. | 126/25 R |
| 5,513,625 | 5/1996 | Landman | 126/555 |
| 5,564,330 | 10/1996 | Nowicke, Sr. | 126/9 R |
| 5,592,871 | 1/1997 | Bartlett | 126/275 R |
| 5,687,704 | 11/1997 | Lerch et al. | 126/25 R |
| 5,749,354 | 5/1998 | Lin | 126/25 R |

*Primary Examiner*—Carl D. Price
*Assistant Examiner*—Josiah C. Cocks
*Attorney, Agent, or Firm*—Clark & Brody

[57] ABSTRACT

A portable cook stove includes a bowl-like grate supported by a column forming a cavity for supplying air to the grate and for receiving ashes falling through the grate. The column is supported on a tray for receiving and retaining ashes removed from the cavity to reduce the likelihood of a fire from hot coals in the ashes.

3 Claims, 1 Drawing Sheet

WOOD COAL COOK STOVE

TECHNICAL FIELD

This invention relates to the art of portable cook stoves, such as those used by campers.

BACKGROUND ART

Various kinds of stoves designed to burn wood or charcoal are known, and many of these are small enough to be considered portable. These stoves generally provide upstanding sidewalls that support a grate for holding the wood or charcoal to be burned. The grate is elevated to provide a space below it for air to flow to the fuel for burning.

For example, U.S. Pat. No. 1,011,675 (Tremoulet) shows a stove having sidewalls, a bottom wall, and an open top. The sidewalls support a grate above the bottom wall, and a hood designed to support articles being heated, such as a cooking pot, covers the top. U.S. Pat. No. 1,042,273 (Roe) shows a stove of similar construction with a flat plate in place of the hood. U.S. Design Pat. No. 172,672 (Lennox) shows a barbecue having a bowl with an upper lip forming a concave grate. The bowl is supported on a base having a cylindrical part that allows air to flow to the grate.

SUMMARY OF THE INVENTION

Most of the portable stoves known in the art are not easily transported and are not easily and safely used in a typical campsite. These known stoves do not allow for supply of adequate amounts of fuel and do not provide an easy way to of dispose of ashes. Further, the disposal of ashes in prior stoves may create a fire hazard in a campsite.

Accordingly, a wood stove in accordance with the invention includes a first part forming a concave grate for holding burning wood or coals for cooking. The grate is supported by a hollow, tapered column formed by a sidewall with a wide opening in its front for admitting air for combustion of the coals and for permitting easy discharge of ashes. The column is, in turn, supported on a tray for receiving ashes discharged from the column so that the ashes do not spill onto the ground and cause a fire hazard.

The cook stove of the invention is preferably made of a fireproof ceramic material, which is both rugged and capable of withstanding high temperatures. The preferred material is that used by NASA for the heat shield on the space shuttle. Other materials include: clay or terracotta fired for an ornamental application.

BRIEF DESCRIPTION OF THE INVENTION

DETAILED DESCRIPTION OF THE PREFERRED EMBODIMENT

Figure 1:
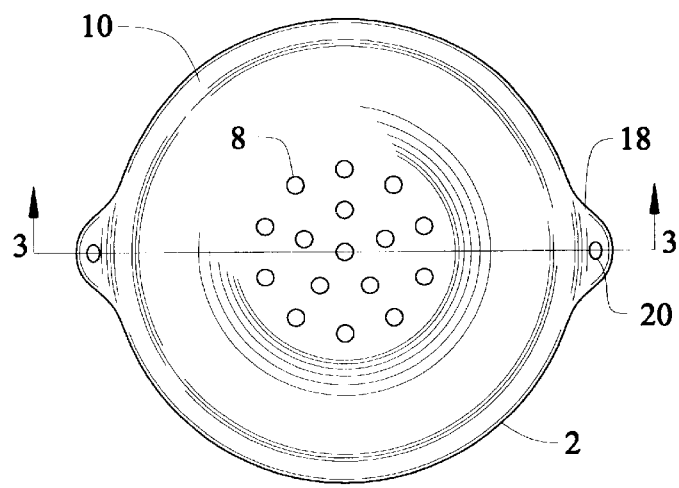
FIG. 1 is a top view of a preferred embodiment of a wood coal or charcoal cook stove in accordance with the invention.
Figure 2:
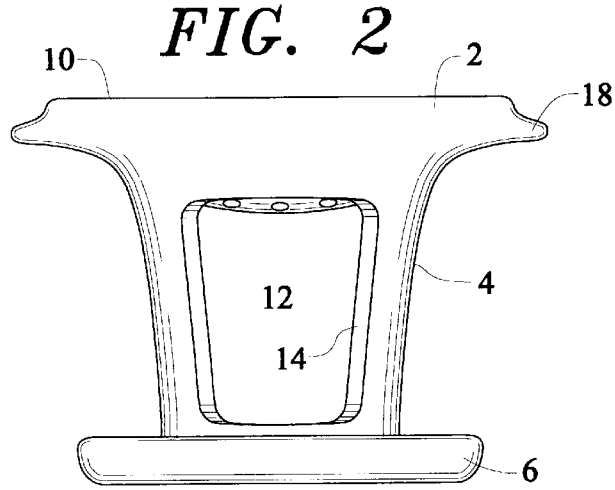
FIG. 2 is a side view of the cook stove shown in FIG. 1.
Figure 3:
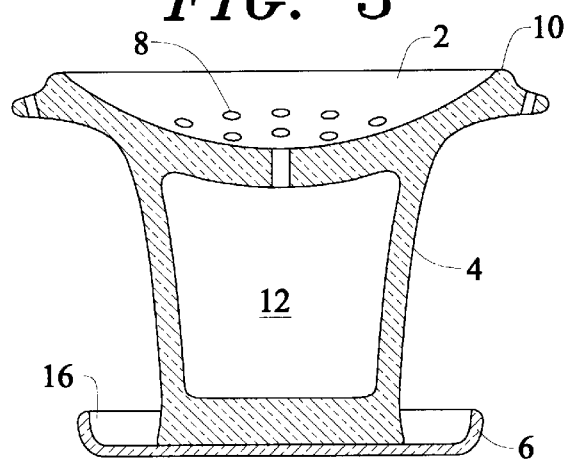
FIG. 3 is a vertical cross section of the cook stove shown in FIG. 1.

With reference to the figures, a preferred embodiment of the cook stove of the invention comprises a bowl-shaped grate 2 that is supported by a column 4. The column 4 is, in turn, supported on a tray 6. Preferably, the bowl 2 and the column 4 are integral, while the tray 6 is a separate part. This facilitates carrying the stove by allowing these two parts to be packed in separate locations. Of course, the bowl and supporting column may be separate elements, or the bowl, column, and tray may be integral.

The bowl 2 is designed to receive burning wood or coal and includes holes 8 for allowing air to pass through the bottom of the bowl to the coals. The diameter of the bowl is preferably about that of a small skillet (e.g. 10–12 inches) whereby the skillet can be rested on the upper edge 10 of the bowl. Smaller skillets, cook pots, or the like can be placed directly on the coals, if desired.

The column 4 comprises a sidewall that is preferably slightly tapered such that it is narrower at its bottom, but which can be vertical. The sidewall forms a cavity 12 therein, and a large opening 14 provides access to the cavity. The large opening serves two purposes. First, the opening allows combustion air to flow through the column to the bottom of the grate. Second, ashes from burned wood or coal that fall through the holes 8 will accumulate in the cavity, and the opening allows the user to remove them easily to ensure free flow of air to the fuel. Because the opening is large, the user can use almost any implement, such as a small stick, to remove the ashes from the cavity.

The column both supports the grate and forms a chimney to allow the formation of a substantial upward draft to increase the flow of air to the grate.

Any ashes that are removed from the cavity will fall into the tray 6, which is provided with an upturned lip 16 to ensure that any hot coals remaining in the ashes removed from the cavity 12 are not accidentally discharged onto the ground to create a fire hazard.

One or more small ears 18 is provided on perimeter of the bowl 2 to facilitate handling of the stove, and each ear may be provided with an opening 20 for receiving a cord (not shown), or the like, for carrying the stove or securing it to another article.

In the preferred embodiment, the stove is ten to twelve inches in height, and the upper diameter of the bowl is also ten to twelve inches. The opening 14 extends from about the bottom of the bowl to just above the tray and is about six inches wide.

The stove is preferably made of fireproof materials that are rugged enough to be knocked about during hiking and camping. The ceramic material used as a heat shield on the space shuttle is one preferred material. Clay or terracotta fired for an ornamental application.

Modifications within the scope of the appended claims will be apparent to those of skill in the art.

I claim:

1. A cook stove comprising:

an upper part forming a concave grate having holes therein for receiving fuel to be burned and forming an upper edge of said stove adjacent said grate, a hollow column supporting said grate, said column being integral with said upper part and having a sidewall and a bottom wall, said sidewall and said bottom wall forming a cavity in direct communication with said grate and having an opening providing access to the cavity for removal of ashes, and a tray engaging the bottom of and supporting said column and adapted to receive ashes removed from said cavity through said opening, wherein the diameter of said tray is greater than that of said column and said tray has an upstanding lip for retaining said ashes in said tray.

2. A cook stove according to claim 1 made of ceramic.

3. A portable cook stove comprising:

a concave grate adapted to hold fuel to be burned, said concave grate having a diameter of less than about twelve inches, a hollow column beneath and supporting said grate, said column comprising a generally cylindrical sidewall with a diameter less than that of said upper part and forming a cavity beneath and in direct communication with said grate, an opening in said sidewall for providing access to the cavity, said opening extending from a location adjacent said grate to a location adjacent the bottom of said column, and a tray beneath said column for receiving ashes removed from said cavity through said opening, said tray having a diameter larger than that of said column and having a upstanding lip for retaining said ashes in said tray, wherein said concave grate and said hollow column are integral.

* * * * *